(12) United States Patent
Vivanco et al.

(10) Patent No.: US 11,785,529 B2
(45) Date of Patent: Oct. 10, 2023

(54) GEOFENCING FOR USER EQUIPMENT

(71) Applicants: AT&T Intellectual Property I, L.P., Atlanta, GA (US); AT&T Technical Services Company, Inc., Vienna, VA (US)

(72) Inventors: Daniel Vivanco, Ashburn, VA (US); David Ross Beppler, Duluth, GA (US); Slawomir Stawiarski, Carpentersville, IL (US)

(73) Assignees: AT&T INTELLECTUAL PROPERTY I, L.P., Atlanta, GA (US); AT&T TECHNICAL SERVICES COMPANY, INC., Vienna, VA (US)

( * ) Notice: Subject to any disclaimer, the term of this patent is extended or adjusted under 35 U.S.C. 154(b) by 205 days.

(21) Appl. No.: 17/317,535

(22) Filed: May 11, 2021

(65) Prior Publication Data
US 2022/0369205 A1    Nov. 17, 2022

(51) Int. Cl.
*H04W 48/04*        (2009.01)
*H04W 4/021*        (2018.01)
(Continued)

(52) U.S. Cl.
CPC .......... *H04W 48/04* (2013.01); *H04W 4/021* (2013.01); *H04W 4/029* (2018.02); *H04W 4/12* (2013.01); *H04W 24/08* (2013.01); *H04W 84/06* (2013.01)

(58) Field of Classification Search
CPC ..... H04W 24/02; H04W 24/08; H04W 4/021; H04W 4/029; H04W 4/12; H04W 48/04; H04W 48/12; H04W 84/06
See application file for complete search history.

(56) References Cited

U.S. PATENT DOCUMENTS

2014/0349653 A1* 11/2014 Kanamarlapudi .... H04W 36/36
455/437
2016/0292696 A1* 10/2016 Gong ................... G08G 5/0086
(Continued)

OTHER PUBLICATIONS

"Motivation for Study on Enhanced LTE Support for Aerial Vehicles," NTT Docomo Inc, Ericsson, 3GPP TSG RAN #75, Dubrovnik, Croatia, Mar. 6-9, 2017, AI 10.1.2, RP-170157, 8 pages.
(Continued)

*Primary Examiner* — Awet Haile
(74) *Attorney, Agent, or Firm* — Amin, Turocy & Watson, LLP

(57) ABSTRACT

An architecture to dynamically create technology based geofences around defined or definable areas for UE, in particular aerial UE, while ensuring the safe operation of UE. A method can comprise identifying aerial user equipment entering a defined geographic area that is controlled by network equipment, monitoring the aerial user equipment and tracking a trajectory associated with the aerial user equipment in relation to a restricted area included in the defined geographic area, determining that the aerial user equipment is proximate to the restricted area, transmitting to the aerial user equipment, a first customized system information block message comprising data representing a warning message, determining that the aerial user equipment, based on the warning message, has not adapted the trajectory to avoid the restricted area, and transmitting to the aerial user equipment a second customized system information block message comprising data representative of a cell individual offset value.

20 Claims, 13 Drawing Sheets

(51) Int. Cl.
  *H04W 4/029* (2018.01)
  *H04W 24/08* (2009.01)
  *H04W 4/12* (2009.01)
  *H04W 84/06* (2009.01)

(56) References Cited

U.S. PATENT DOCUMENTS

| | | | |
|---|---|---|---|
| 2019/0278302 A1* | 9/2019 | Sundaresan | G05D 1/104 |
| 2020/0033128 A1* | 1/2020 | Baratz | G05D 1/0094 |
| 2020/0363824 A1* | 11/2020 | Levin | G01S 13/89 |
| 2021/0051595 A1* | 2/2021 | Rico Alvarino | H04B 7/18502 |
| 2021/0314853 A1* | 10/2021 | Bai | H04W 48/12 |
| 2022/0272612 A1* | 8/2022 | Ingale | H04W 48/10 |
| 2022/0392353 A1* | 12/2022 | Contreras | G08G 5/006 |

OTHER PUBLICATIONS

"New SID on Enhanced Support for Aerial Vehicles," NTT Docomo Inc, Ericsson, 3GPP TSG RAN Meeting #75, Dubrovnik, Croatia, Mar. 6-9, RP-170742, 5 pages, Mar. 6-9, 2017.
"New SID on Enhanced Support for Aerial Vehicles," NTT Docomo Inc, Ericsson, 3GPP TSG RAN Meeting #75, Dubrovnik, Croatia, Mar. 6-9, RP-170779, 4 pages, Mar. 6-9, 2017.

* cited by examiner

| IE Name | Criticality | #Octets | Description |
|---|---|---|---|
| Message Type | YES | 1-512 | UAV.geofencing |
| Destination UE Type | YES | 1-512 | aerial |
| Destination UE imsi | YES | 1-1024 | 123 |
| Warning Area Coordinates | YES | 1-1024 | x/y |
| Warning Type | YES | 1-1024 | amber alert |
| Target Neighbor Cell | YES | 1-1024 | Cell.2 |
| Target Neighbor Cell.CIO | YES | 1-1024 | -100 |

FIG. 7

GEOFENCING FOR USER EQUIPMENT

TECHNICAL FIELD

The disclosed subject matter relates to detection of aerial user equipment (UE) approaching defined restricted areas and creating technology based geofencing areas around these defined restricted areas.

BACKGROUND

Wireless operators can use terrestrial cellular network equipment, such as long-term evolution (LTE) and/or fifth-generation (5G) core mobile network operator (MNO) equipment to provide services to aerial UE. Aerial user equipment UE can have multiple use cases (e.g., delivery, monitoring, . . . ). Wireless operators can have aerial coverage maps, which can indicate areas with and without cellular coverage. In addition, unmanned aerial vehicles (UAVs), such as aerial UE, can scan neighbor equipment signal pilots (e.g., reference signal received power (RSRP) measurement values) to determine whether it can fly in a given direction.

BRIEF DESCRIPTION OF DRAWINGS

FIG. 7 illustrates example information elements that can comprise customized SIB messages, in accordance with aspects of the subject disclosure.

DETAILED DESCRIPTION

Figure 1:
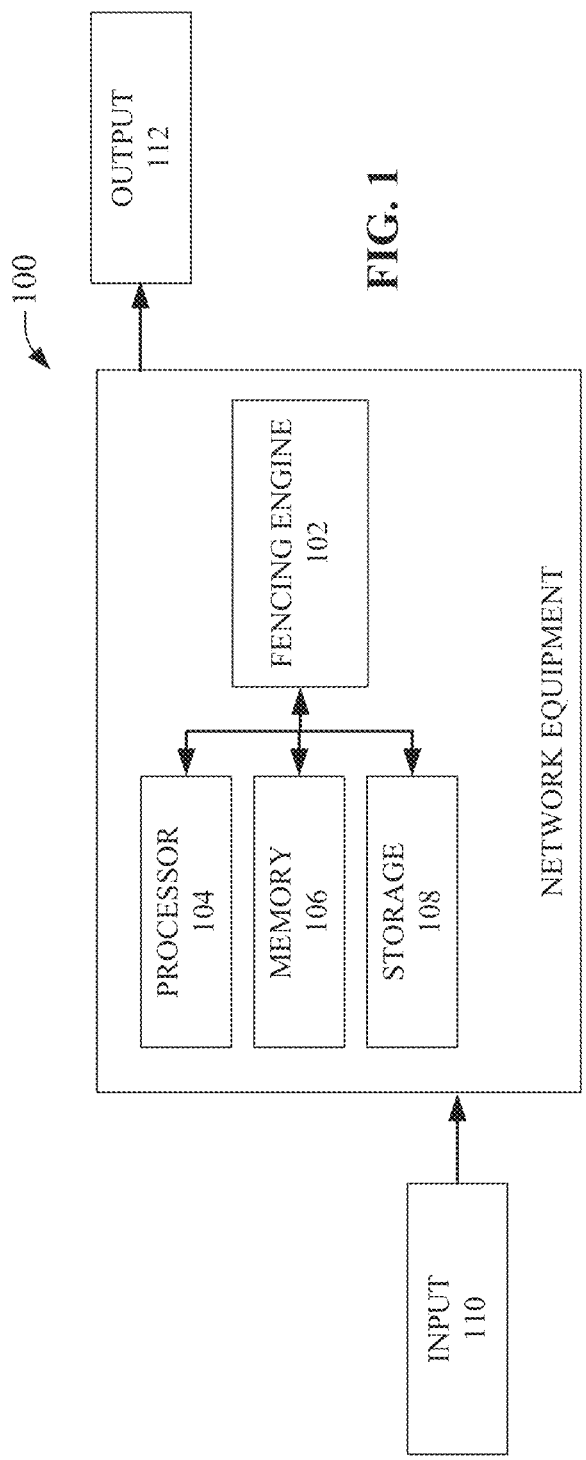
FIG. 1 is an illustration of a system that dynamically create technology based geofences around defined or definable areas for UE, in particular aerial UE, while ensuring the safe operation of UE, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

The disclosed subject matter, in accordance with various embodiments, provide a system, apparatus, equipment, or device comprising: a processor, and a memory that stores executable instructions that, when executed by the processor, facilitate performance of operations. The operations can comprise identifying aerial user equipment entering a defined geographic area based on subscription data, wherein the defined geographic area is controlled by the network equipment, monitoring the aerial user equipment and tracking a trajectory associated with the aerial user equipment in relation to a restricted area included in the defined geographic area, determining, based on the trajectory of the aerial user equipment, that the aerial user equipment is encroaching into the restricted area, and in response to determining that the aerial user equipment is encroaching into the restricted area, transmitting to the aerial user equipment a customized system information block message comprising data representing a cell individual offset value.

Additional operations can include tracking the trajectory associated with the aerial user equipment using a multilateration process, tracking the trajectory associated with the aerial user equipment using a latitudinal coordinate value received from global navigation satellite system equipment, tracking the trajectory associated with the aerial user equipment using a longitudinal coordinate value received from global navigation satellite system equipment, and tracking the trajectory associated with the aerial user equipment using a triangulation process that employs light amplification by stimulated emission of radiation and a return of reflected light to receiver equipment to determine that the trajectory associated with the aerial user equipment is encroaching into the restricted area.

In regard to the foregoing the subscription data can represent: an international mobile subscriber identifier value representative of the aerial user equipment; and flag data indicating that the aerial user equipment is airborne user equipment. Further, the cell individual offset value can be a negative value that is applied to a signal pilot associated with serving cell equipment. Additionally and/or alternatively, the cell individual offset value can be used to bias a first signal pilot associated with first serving cell equipment relative to a second signal pilot associated with second serving cell equipment. Moreover, when the trajectory is a first trajectory, and based on the cell individual offset value the aerial user equipment can adapt the first trajectory to correspond with a second trajectory that avoids the restricted area.

In accordance with further embodiments, the subject disclosure describes methods and/or processes, comprising a series of acts that, for example, can include: identifying aerial user equipment entering a defined geographic area based on subscription data, wherein the defined geographic area is controlled by network equipment, monitoring the aerial user equipment and tracking a trajectory associated with the aerial user equipment in relation to a restricted area included in the defined geographic area, based on the trajectory of the aerial user equipment, determining that the aerial user equipment will imminently encroach into the restricted area, and in response to determining that the aerial user equipment imminently will encroach into the restricted area, transmitting, to the aerial user equipment, a customized system information block message comprising data representing a warning message.

Further acts can include facilitating displaying the warning message for view by an operator entity on display equipment associated with the aerial user equipment, when the customized system information block message is a first customized system information block message, and when a second customized system information block message is transmitted to the aerial user equipment, the second customized system information block message can comprise data representative of a cell individual offset value.

In the context of the foregoing, the cell individual offset value can be a negative value that can be applied to a signal pilot associated with serving cell equipment. Also, the cell individual offset value can bias a first signal pilot associated with first serving cell equipment relative to a second signal pilot associated with second serving cell equipment. Additionally, when the trajectory is a first trajectory, and when, based on the cell individual offset value, the aerial user equipment can modify the first trajectory to correspond with a second trajectory.

In accordance with still further embodiments, the subject disclosure describes machine readable media, a computer readable storage devices, or non-transitory machine readable media comprising instructions that, in response to execution, cause a computing system (e.g., equipment, devices, groupings of devices, etc.) comprising at least one processor to perform operations. The operations can include: identifying aerial user equipment entering a defined geographic area based on subscription data, wherein the defined geographic area is controlled by network equipment, monitoring the aerial user equipment and tracking a trajectory associated with the aerial user equipment in relation to a restricted area included in the defined geographic area, based on the trajectory of the aerial user equipment, determining that the aerial user equipment is proximate to the restricted area, in response to determining that the aerial user equipment is proximate to the restricted area, transmitting to the aerial user equipment, a first customized system information block message comprising data representing a warning message, determining that the aerial user equipment, based on the warning message, has not adapted the trajectory to avoid the restricted area, and transmitting to the aerial user equipment a second customized system information block message comprising data representative of a cell individual offset value.

With respect to the foregoing, the cell individual offset value can be a negative value that is applied to a signal pilot associated with serving cell equipment. Further, the cell individual offset value can bias a first signal pilot associated with first serving cell equipment relative to a second signal pilot associated with second serving cell equipment.

The subject disclosure, in example embodiments, describes detection of user equipment, such as aerial or airborne user equipment (UE) approaching restricted areas, such as airports, military bases, identifiable governmental buildings, and the like, and based at least in part on the detection of the approaching aerial UE in the proximity of the restricted areas creating or establishing a technology based geofencing around the restricted area. In some embodiments, customized system information broadcast (SIB) messages can be used directed to UE in the vicinity of serving cell equipment. The customized SIB messages typically can comprise groups of information elements (IEs) that can be employed to identify customized SIB messages, the UE to which the customized SIB messages are directed to, and groups of requested actions that the UE is to perform on receipt of the customized SIB messages.

As noted earlier, wireless mobile network operator entities (MNOs) can use terrestrial cellular network equipment, such as long-term evolution (LTE) and/or fifth-generation (5G) core mobile network operator (MNO) equipment (e.g., serving cell equipment, base station equipment, access point equipment, internet of things (IoT) equipment, picocell equipment, femtocell equipment, and/or other similar and pertinent equipment) to provide services to aerial UE. Aerial UE can have multiple use cases (e.g., delivery, monitoring, . . . ). Wireless MNOs can have aerial coverage maps, which can indicate areas with and without cellular coverage. In addition, unmanned aerial vehicles (UAVs), such as aerial UE, can scan neighbor equipment signal pilots (e.g., reference signal received power (RSRP) measurement values) to determine whether it can fly in a given direction. In instances where signal pilots are not detectable in a direction in which a UAV is traversing, the UAV can change or adjust its trajectory to better align with cellular coverage where appropriate signal pilots are more evident.

There can be areas within the country that can be considered off-limits, such as militarily sensitive areas, governmentally designated sensitive areas (e.g., the White House, Capitol buildings, . . . ), ad hoc areas that can be designated as sensitive areas for defined periods of time (e.g., during special events, . . . ), airports, and contemporaneously established finite duration areas set up for the purposes of emergencies, special events, and the like. MNOs need to create technology constraints to restrict these areas, while at the same time ensuring the safe operation of UAVs within their spheres of influence (e.g., within areas monitored and/or controlled by equipment associated with the MNO). The standards organizations that develop protocols, standards, and/or recommendations for mobile telecommunications, such as the 3rd generation partnership project (3GPP), have yet to address this issue.

The subject disclosure provides for detecting UE (e.g., terrestrial based UE and/or airborne aerial UE) approaching restricted areas, and in response to detecting UE approaching restricted areas, a technology based geofence is established around the restricted areas or specific sectors or sub-areas of the restricted areas, while at the same time ensuring the safe operation of UE.

In some embodiments, the UE is identified based, for example, on international mobile subscriber identifier (IMSI) values, or subscriber identity module or subscriber identification module (SIM) values (e.g., one or more integrated circuits that can securely store subscriber identification values and related key values and that can be used to identify and authenticate subscriber UE).

In various other embodiments, the approaching UE are identified based on other subscriber or subscription data, such as unique UE serial number values, governmentally issued unique identification values (e.g., federal aviation administration tag values), UE manufacturer serial number values, unique visual identification values affixed to UE, unique identification values rendered perceivable using, for example, irradiated ultra-violet light, and/or unique identification values rendered observable, for instance, through illumination using infra-red light.

In other embodiments, identification of approaching UE can be facilitated using one-dimensional and/or multi-dimensional scanning technologies and barcode symbology, such as universal product codes (UPCs), matrix bar codes (e.g., quick response (QR) codes) comprising machine-readable optical labels, and the like that can include information about the equipment to which it is attached.

In one embodiment, having identified and/or detected approaching UE, the detected UE can be monitored and tracked to determine whether or not the approaching UE is on a trajectory that may encroach into the vicinity of identified or identifiable restricted areas. In order to determine whether or not the approaching UE may be on a trajectory that may encroach into identified and/or identifiable restricted areas, artificial intelligence technologies, neural networking architectures, collaborative filtering processes, machine learning techniques, and/or big data mining functionalities can be utilized, wherein, for example, probabilistic determinations based at least in part on cost benefit analyses (e.g., the cost of taking a particular action is weighed against the benefit of taking the particular action, wherein in response to determining that the benefit associated with the action outweighs the cost associated with the action, the action is identified as an action worthy of consideration and implementation) can be undertaken. In additional and/or alternative other embodiments, artificial intelligence technologies, neural networking architectures, collaborative filtering processes, machine learning techniques, Bayesian belief systems, big data mining and data analytic functionalities, and the like, can be employed, wherein, for example, multi-objective optimization (e.g., Pareto optimization) can be used to determine whether or not an action should be initiated and implemented. Multi-objective optimization can ensure that first actions or groups of first actions can only be implemented provided that other second actions or groups of other second actions are not detrimentally affected.

In an example embodiment, in order to track UE entering and/or exiting the control and/or the monitoring ambit (e.g., processes in execution), one or more global navigation satellite system (GNSS) equipment can be used that can provide geolocation and/or time information to global positioning satellite (GPS) equipment (e.g., transmitter and/or receiver equipment) anywhere on or near the earth where there is an unobstructed line of sight to the one or more GNSS equipment, such as one or more GPS satellites in various earth orbits. Additionally and/or alternatively, other triangulation processes can be used to keep track of UE. For instance, in various embodiments, ranges (e.g., variable distances) can be determined by targeting UE with light amplification by stimulated emission of radiation (e.g., laser) and measuring the time for the reflected light to return to one or more receiver (e.g., lidar) can be used to track UE approaching and/or entering into a determined vicinity of a restricted area. In a similar manner, a detection system that uses radio waves to determine the range, angle, or velocity of objects (e.g., radar) can be used to determine whether or not UE are approaching and/or entering into the determined vicinity of the restricted area. Other mechanisms to track UE can also include using multilateration (e.g., determining UE position based on the measurement of the times of arrival (TOA) of one or more energy wave (e.g., radio, acoustic, seismic, etc.) having known waveforms and/or speed when propagating either from and/or to multiple emitters and/or receivers of the waves) between one or more network equipment (e.g., serving cell equipment, base station equipment, internet of things (IoT) equipment, picocell equipment, femtocell equipment, and similarly functional equipment). In some instances, a UE's returned signal strength values to various antennae associated with the one or mode network equipment can be used to triangulate and provide a positional references as to the trajectory of an individual UE.

The described embodiments, based on determining that UE are approaching defined or determinable restricted areas, can initiate processes to facilitate and/or effectuate the following tasks: (a) mandate serving cell equipment proximate, tracking, and/or monitoring the trajectory of UE to transmit a customized system information block (SIB) message to the UE to warn the operator (e.g., user entity), via display equipment associated with the UE (e.g., aerial UE) that the UE is about to encroach into the defined or determinable restricted area, and that the operator should instruct the UE to change trajectory to avoid the defined or determinable restricted area; and (2) when serving cell equipment proximate, tracking, and/or monitoring the trajectory of UE observes that the UE has not changed its trajectory to avoid entering the defined or determinable restricted area, and is getting close to entering the defined or determinable restricted area, the disclosed systems and/or methods can direct serving cell equipment proximate, tracking, and/or monitoring the trajectory of UE to establish an artificially established coverage hole in order to deter the encroaching UE from entering the defined and determined restricted area by adjusting or changing its trajectory away from the restricted area, and to ensure that the encroaching UE avoid the artificially established coverage hole.

In the foregoing manner, one or more of the disclosed embodiments can create a technology based geofence around restricted areas for UE (e.g., aerial UE) served by terrestrial based LTE and/or 5G network equipment associated with MNOs. It will be noted that restricted areas, in some embodiments, can be permanently restricted areas, such around airports, military bases, and identified governmental structures (e.g., parliamentary buildings, important governmental offices, and similar such structures). In other embodiments, the restricted areas and be contemporaneously and temporarily established, such as when special events are planned or are on-going during determined times, during times of national emergencies (e.g., localized disaster relief efforts, . . . ), and the like.

In the context of the subject disclosure, network equipment and/or serving cell equipment can typically be base station equipment, eNodeB equipment, eNB equipment, gNodeB equipment, picocell equipment, macrocell equipment, microcell equipment, femtocell equipment, IoT equipment operating as mobile network operation (MNO) network equipment, access point equipment, or other such equipment. Further, the disclosed systems and/or methods can be operational at central node global control equipment (e.g., network equipment) located in the core network. Examples of central node global control equipment can be mobile edge computing (MEC) equipment, self organized network (SON) equipment, and/or radio access network intelligent controller (RIC) equipment.

In some embodiments, UE information data and/or UE device type data is collected. It can be detected when, where, and whether an aerial UE is attached to, and/or is in operative communication with, the core network (or identifiable segments of the core network). Additionally, in accordance with further example embodiments, data can be collected that is representative of serving cell equipment capabilities, as well as network topologies of serving cell equipment (e.g., the network topologies of serving cell equipment currently providing service to aerial UE and/or terrestrial based UE situated within the broadcast range of current cell equipment and neighboring serving cell equipment that can be immediately proximate to, or positioned at distance from, current serving cell equipment). In accordance with various other example embodiments, data can also be collected that is representative of the geographical topographies and/or locations within which current serving cell equipment and its neighboring serving cell equipment are situated.

In accordance with some embodiments, based at least in part on data representative of UE information and UE device type, it can be determined whether or not a UE is an aerial UE. Information in regard to whether or not UE is an aerial type UE or terrestrial based UE can be conveyed and communicated to central node global control equipment as a flag comprising one or more bits. The central node global control equipment can then utilize and/or consult, for example, one or more database equipment comprising groups of relevant database tuples to correlate the received bits with an UE type (e.g., aerial UE or terrestrial based UE).

Additionally, central node global control equipment, based at least in part on data representative of serving cell equipment capabilities, network topologies of serving cell equipment, and the geographical topographies and/or locations within which serving cell equipment are situated, can detect the approach of UE, such as airborne or aerial UE, into the proximity of restricted areas. For instance, with reference to FIG. 2, central node global control equipment can detect the approach and/or entry of airborne or aerial UE 202 into the proximity of area 200 being monitored and/or controlled by central node global control equipment, and in particular into the general vicinity of restricted area 206.

Figure 2:
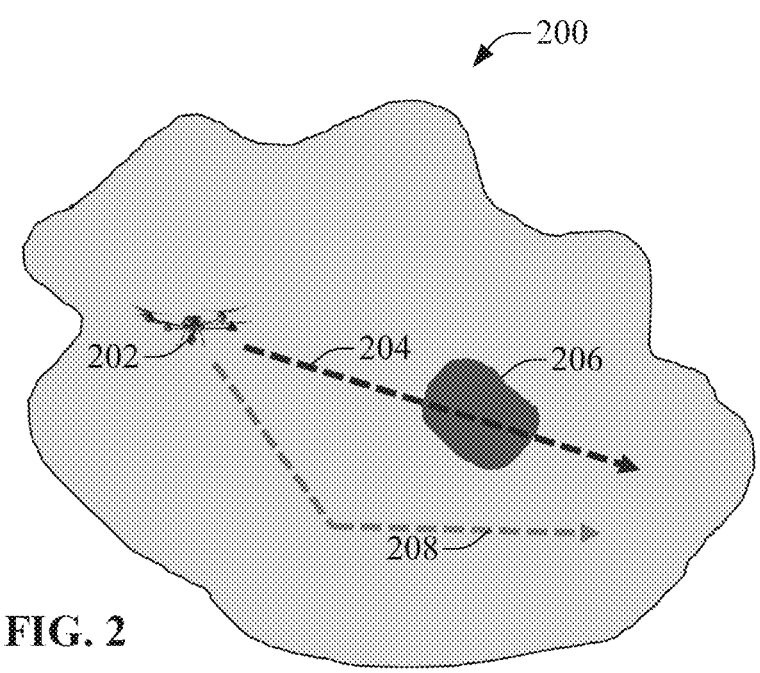
FIG. 2 provides illustration of possible trajectories associated with an aerial UE entering a controlled and monitored airspace and encroaching and/or avoiding a restricted airspace in the controlled and monitored airspace, in accordance with aspects of the subject disclosure.

As illustrated in FIG. 2, two trajectories are depicted a first putative or presumed trajectory 204 and a second putative or presumed trajectory 208. The first putative trajectory 204 can be a trajectory that central node global control equipment can determine as being a trajectory that can cause aerial UE 202 to encroach into airspace 206 that is restricted and/or "off-limits," whereas the second putative trajectory 208 can be a trajectory that the central node global control equipment can determine as being is a trajectory that can cause aerial UE 202 to avoid and/or circumvent restricted airspace 206 and thereby not encroach into the restricted area 206.

Figure 5:
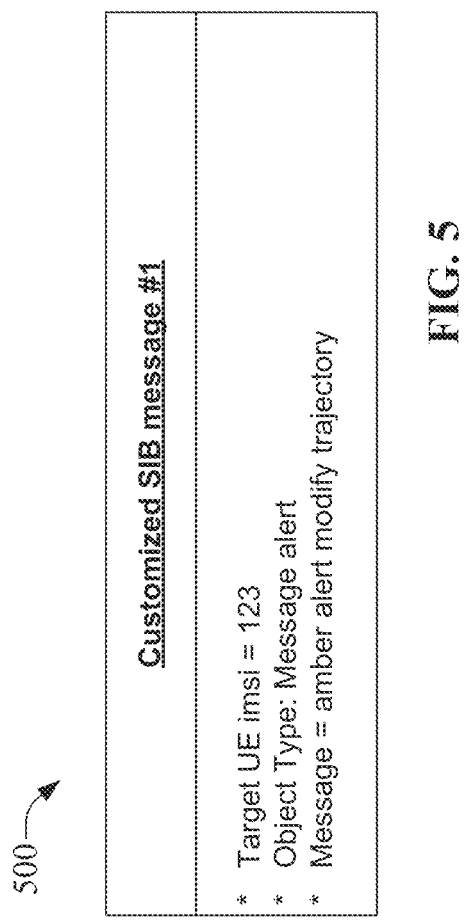
FIG. 5 provides illustration of a first customized system information block message, in accordance with aspects of the subject disclosure.

In order to cause aerial UE 202 to utilize the second putative trajectory 206 in preference to the first putative trajectory 208, central node global control equipment on determining that aerial UE 202 appears to be on a trajectory (e.g., first putative trajectory 204) that would take it into the restricted area 206 can generate a first customized SIB message. The first customized SIB message can comprise a warning message displayed, for example, on display equipment associated with aerial UE 202 and indicating to an operator entity controlling aerial UE 202 that aerial UE 202 should modify its trajectory. An example of the first customized SIB message is illustrated in FIG. 5. Once central node global control equipment has conveyed the first customized SIB message, for instance, via serving cell equipment specifically proximate to aerial UE 202, central node global control equipment can wait for a defined or determinable hiatus time period (e.g., threshold time period). The defined or determinable hiatus time period (e.g., the value of the hiatus time period, threshold time period value, . . . ) can be determined, for example, based on the velocity of aerial UE 202, the position of aerial UE 202 within area 200, and/or the position of aerial UE 202 in relation to airspace 206 that is restricted. As will be appreciated by those of ordinary skill in the art, the closer aerial UE 202 is in relation to airspace 206 to more imminent the chances that aerial UE 202 will unwittingly encroach into airspace 206 and commensurately the shorter the duration of the hiatus time period.

Figure 6:
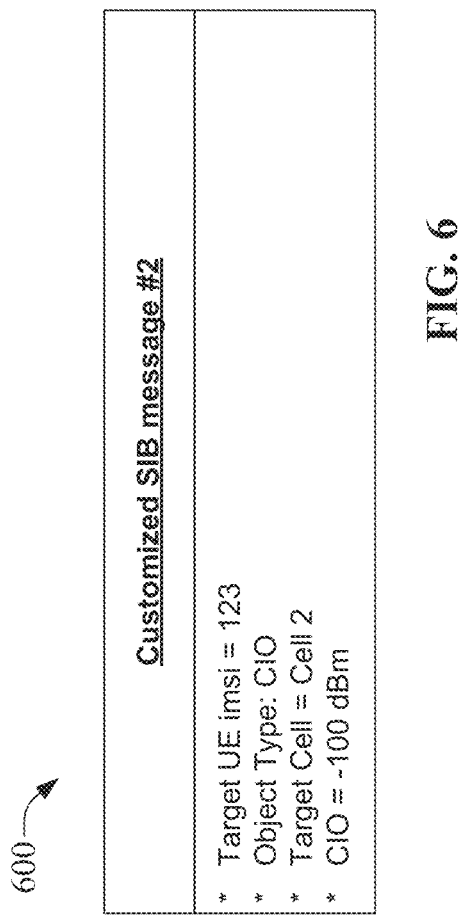
FIG. 6 provides depiction of a second customized system information block message, in accordance with aspects of the subject disclosure.

During the hiatus time period, central node global control equipment can monitor and track aerial UE 202 within area 200, observing whether or not aerial UE 202 is moving toward or away from restricted airspace 206. In instances, where central node global control equipment, while the hiatus time period has yet to elapse, observes and/or determines that aerial UE 202 is rapidly moving toward restricted airspace 206, central node global control equipment can facilitate or effectuate the generation and/or transmission of a second customized SIB message. The second customized SIB message 600 is depicted in FIG. 6. The second customized SIB message 600 can be a transmission message that causes aerial UE 202 to perceive that the trajectory it is currently following is not the most viable trajectory since there is a radio signal coverage void (e.g., a technology based geofenced area has been established along the current trajectory), and as such aerial UE 202 should determine and elect an alternative trajectory with which to traverse through area 200 (e.g., a trajectory that better aligns with second putative trajectory 208 that can cause aerial UE 202 to avoid and/or circumvent restricted airspace 206).

After the hiatus time period has elapsed and if determined that aerial UE 202 has continued on the first putative trajectory 204, central node global control equipment can facilitate and/or effectuate the generation and/or transmission of the second customized SIB message 600 as illustrated in FIG. 6. The second customized SIB message 600 can be generated by one or more serving cell equipment that can be situated proximate to the current location of aerial UE 202 and transmitted to the aerial UE 202. The second customized SIB message 600, as noted above, can be a message that facilitates aerial UE 202 to adjust its current trajectory (e.g., first putative trajectory 204) to better align with the second putative trajectory 208 that avoids restricted airspace 206. The generation and/or transmission, by proximate serving cell equipment, of second customized SIB message 600 to aerial UE typically does not impact other UE (aerial UE and/or terrestrial based UE) since the customized SIB messages (e.g., first customized SIB message 500, second customized SIB message 600, and subsequent customized SIB message, if any, are directed specifically to aerial UE 202 based on UE IMSI value (e.g., Target UE IMSI=123). Further, in instances where aerial UE 202 hands over to other serving cell equipment (e.g., target cell equipment), the target cell equipment can also perform the same analysis until it is guaranteed that the trajectory being followed by aerial UE 202 is away from the restricted area (e.g., a trajectory that better corresponds with second putative trajectory 208).

Now with reference to FIG. 1 that illustrates a system 100 (e.g., network equipment) that dynamically creates technology based geofences around defined or definable areas for UE, in particular aerial UE, while ensuring the safe operation of UE. Examples of central node global control equipment can be MEC equipment, SON equipment, and/or RIC equipment.

As illustrated system 100 can comprise fencing engine 102 that can be communicatively coupled to processor 104, memory 106, and storage 108. Fencing engine 102 can be in communication with processor 104 for facilitating operation of computer and/or machine executable instructions and/or components by fencing engine 102, memory 106 for storing data and/or the computer or machine executable instructions and/or components, and storage 108 for providing longer term storage for data and/or machine and/or computer machining instructions. Additionally, system 100 can receive input 110 for use, manipulation, and/or transformation by fencing engine 102 to produce one or more useful, concrete, and tangible result, and/or transform one or more articles to different states or things. Further, system 100 can also generate and output the useful, concrete, and tangible results, and/or the transformed one or more articles produced by fencing engine 102, as output 112.

In some embodiments, system 100 can be Internet of Things (IoT) small form factor equipment capable of effective and/or operative communication with a network topology. Additionally in alternative embodiments, system 100 can be any type of mechanism, machine, device, apparatus, equipment, and/or instrument that can be utilized to dynamically configure inter-cell interference coordination between terrestrial based serving cell equipment that are serving aerial UE. Examples of types of mechanisms, equipment, machines, devices, apparatuses, and/instruments can include virtual reality (VR) devices, wearable devices, heads up display (HUD) devices, machine type communication devices, and/or wireless devices that communicate with radio network nodes in a cellular or mobile communication system. In various other embodiments, system 100 can comprise tablet computing devices, handheld devices, server class computing machines and/or databases, laptop computers, notebook computers, desktop computers, cell phones, smart phones, commercial and/or consumer appliances and/or instrumentation, industrial devices and/or components, personal digital assistants, multimedia Internet enabled phones, Internet enabled devices, multimedia players, aeronautical/avionic devices associated with, for example, orbiting satellites and/or associated aeronautical vehicles, and the like.

Fencing engine 102 can identify UE, e.g., aerial UE, based at least in part, for example, on IMSI values, or SIM values. Additionally and/or alternatively, fencing engine 102 can identify approaching UE based other subscriber or subscription data, such as unique UE serial number values, governmentally issued unique identification values, such as federal aviation administration tag values, UE manufacturer serial number values, UE model number values, unique visual identification values affixed to UE, unique identification values rendered perceivable using, for example, irradiated ultra-violet light, and/or unique identification values rendered observable, for instance, through illumination using infra-red light.

In other embodiments, identification of approaching UE can be facilitated by fencing engine 102 through use of one-dimensional and/or multi-dimensional scanning technologies and barcode symbology, such as UPCs, matrix bar codes comprising machine-readable optical labels, and the like that can include information about the equipment to which it is attached.

In yet additional embodiments, identification of approaching UE can be effectuated fencing engine 102 by using computer-vision based recognition technologies, wherein one or more unique surface contours (or identifiable surface point patterns) of the approaching UE can be compared with repositories and databases of manufacture defined contours or determinable surface point patterns associated with UE.

Fencing engine 102, having identified and/or detected approaching UE can monitor and track the detected UE to determine whether or not the approaching UE is on a trajectory that may encroach into the vicinity of identified or identifiable restricted areas. In order to determine whether or not the approaching UE may be on a trajectory that may encroach into identified and/or identifiable restricted areas, fencing engine 102, in some embodiments can utilize, for instance, artificial intelligence technologies, neural networking architectures, collaborative filtering processes, machine learning techniques, and/or big data mining functionalities, wherein, for example, probabilistic determinations based at least in part on cost benefit analyses can be performed.

In additional and/or alternative other embodiments, the fencing engine 102 can employ artificial intelligence technologies, neural networking architectures, collaborative filtering processes, machine learning techniques, Bayesian belief systems, big data mining and data analytic functionalities, and the like, wherein, for example, multi-objective optimization can be used to determine whether or not an action should be initiated and implemented. Multi-objective optimization can ensure that first actions or groups of first actions can only be implemented provided that other second actions or groups of other second actions are not detrimentally affected.

Fencing engine 102, in order to track UE entering and/or exiting the control and/or the monitoring ambit of equipment associated with network equipment 100, can also use one or more GNSS equipment that can provide geolocation and/or time information to GPS equipment anywhere on or near the earth where there is an unobstructed line of sight to the one or more GNSS equipment, such as one or more GPS satellites in various earth orbits.

Additionally and/or alternatively, fencing engine 102, in some embodiments, can use other triangulation processes to keep track of UE. For instance, in various embodiments, methods for determining ranges (e.g., variable distances) by targeting UE with light amplification by stimulated emission of radiation and measuring the time for the reflected light to return to one or more receiver can be used to track UE approaching and/or entering into a determined vicinity of a restricted area. In a similar manner, fencing engine 102 can use the facilities and/or functionalities of detection systems that use radio waves to determine the range, angle, or velocity of objects and to determine whether or not UE are approaching and/or entering into the determined vicinity of the restricted area.

Other mechanisms used by fencing engine 102 to track UE can also include determining UE position based on the measurement of the TOA of one or more energy wave having known waveforms and/or speed when propagating either from and/or to multiple emitters and/or receivers of the waves such as one or more network equipment (e.g., serving cell equipment, base station equipment, IoT equipment, picocell equipment, femtocell equipment, and similarly functional equipment). In some instances, a UE's returned signal strength values to various antennae associated with the one or mode network equipment (e.g., network equipment 100, serving cell equipment, base station equipment, IoT equipment, picocell equipment, femtocell equipment, and similarly functional equipment, . . . ) can be used to triangulate and provide positional references as to the trajectory of an individual UE.

Fencing engine 102 based on determining that UE is approaching a restricted area can initiate processes to facilitate and/or effectuate the following tasks: (a) mandate serving cell equipment proximate, tracking, and/or monitoring the trajectory of UE to transmit a customized system information block (SIB) message to the UE to warn an operator/user entity, via display equipment associated with the UE that the UE is about to encroach into the defined or determinable restricted area, and that the operator/user should direct the UE to change trajectory to avoid the defined or determinable restricted area; and/or (2) when serving cell equipment proximate, tracking, and/or monitoring the trajectory of UE observes that the UE has not changed its trajectory to avoid entering the defined or determinable restricted area, and is getting close to entering the defined or determinable restricted area, the fencing engine 102 can require serving cell equipment proximate, tracking, and/or monitoring the trajectory of UE to establish an artificially established coverage hole in order to deter the encroaching UE from entering the defined and determined restricted area by adjusting or changing its trajectory away from the restricted area, and to ensure that the encroaching UE avoid the artificially established coverage hole.

In the foregoing manner, fencing engine 102 can create a technology based geofence around restricted areas for UE (e.g., aerial UE) served by terrestrial based LTE and/or 5G network equipment associated with MNOs. As has been observed earlier, restricted areas, in some embodiments, can be permanently restricted areas, such around airports, military bases, and identified governmental structures (e.g., parliamentary buildings, important governmental offices, and similar such structures). In other embodiments, the restricted areas and be contemporaneously and temporarily established, such as when special events are planned or are on-going during determined times, during times of national emergencies (e.g., localized disaster relief efforts, . . . ), and the like.

Figure 3:
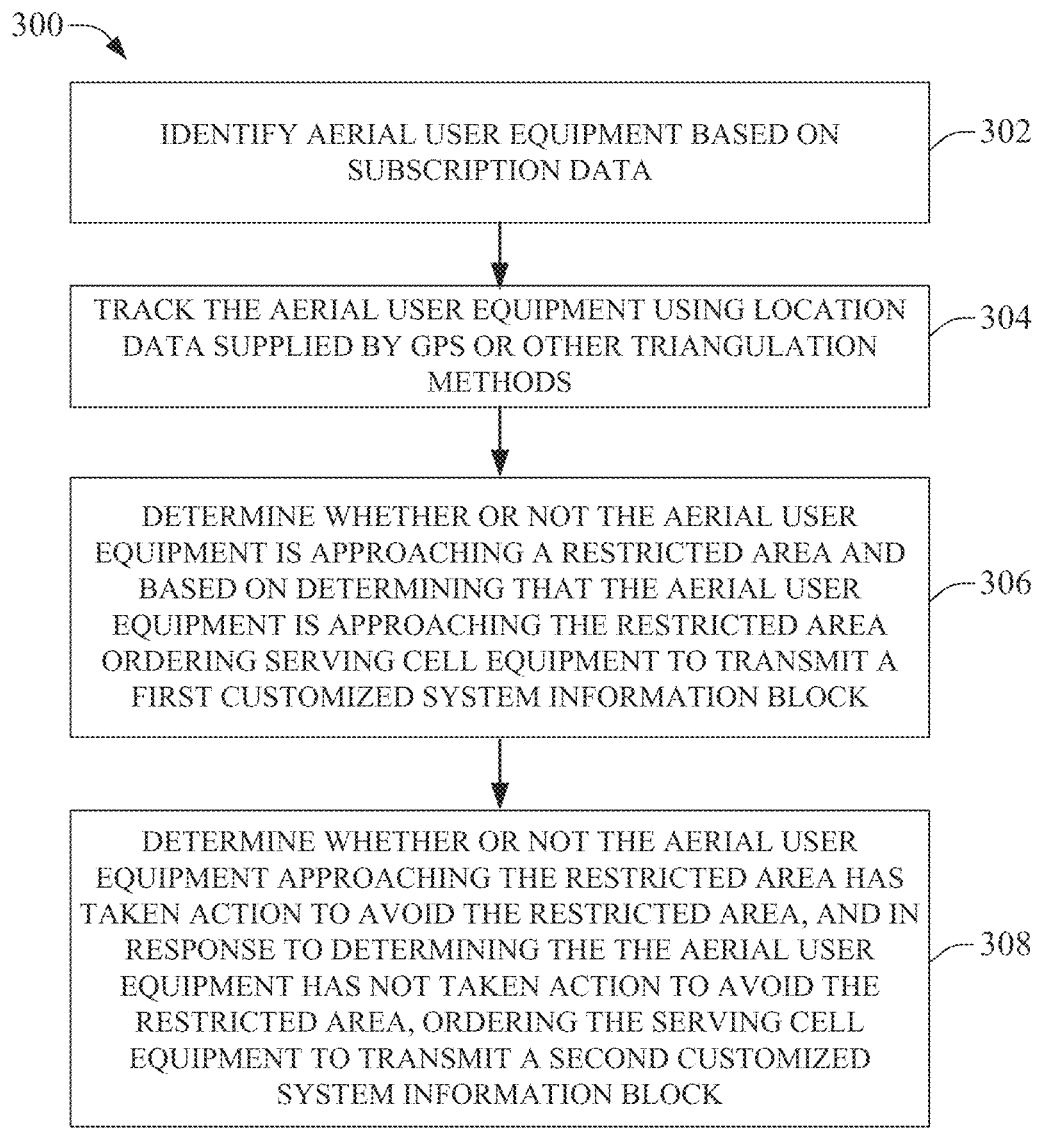
FIG. 3 provides illustration of a flow chart or method for dynamically creating technology based geofences around defined or definable areas for UE, in particular aerial UE, while ensuring the safe operation of UE, in accordance with aspects of the subject disclosure.
Figure 4:
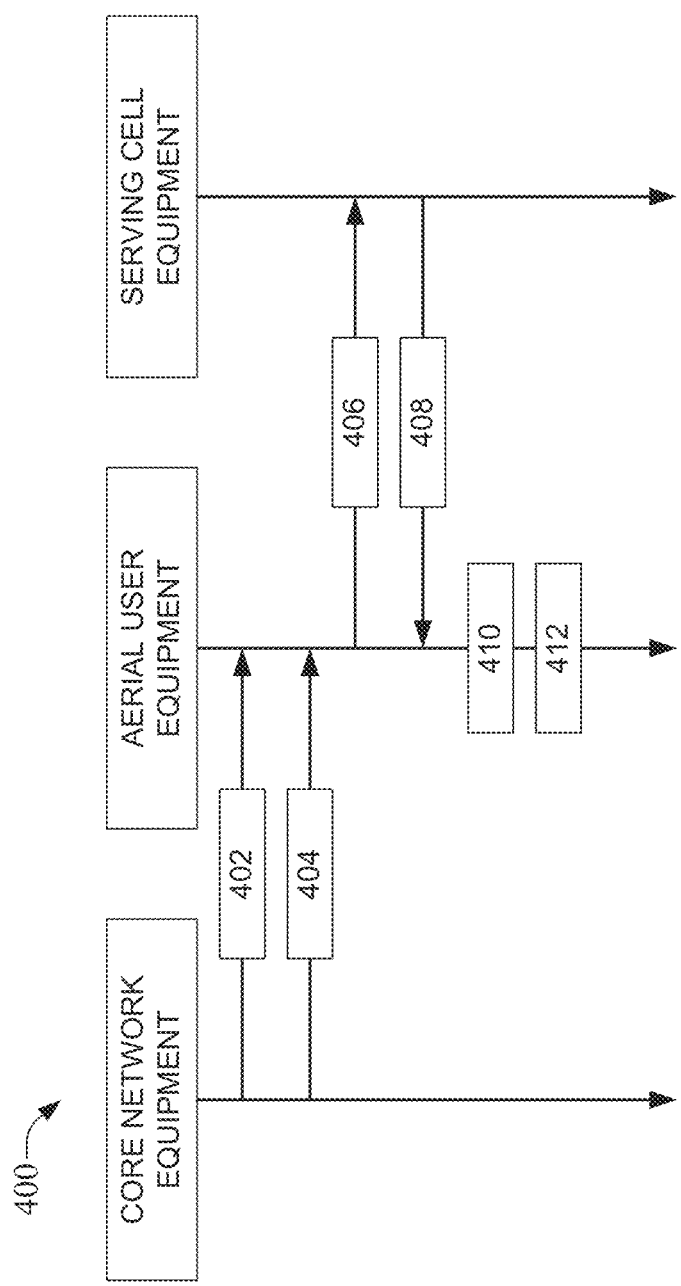
FIG. 4 provides illustration of a time sequence chart or method for dynamically creating technology based geofences around defined or definable areas for UE, in particular aerial UE, while ensuring the safe operation of UE, in accordance with aspects of the subject disclosure.

In view of the example system(s) described above, example method(s) that can be implemented in accordance with the disclosed subject matter can be better appreciated with reference to the flowcharts and/or illustrative time sequence charts in FIGS. 3-4. For purposes of simplicity of explanation, a example method disclosed herein is presented and described as a series of acts; however, it is to be understood and appreciated that the disclosure is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, the disclosed example method can be implemented in combination with one or more other methods, to accomplish one or more aspects herein described. It should be further appreciated that the example method disclosed throughout the subject specification are capable of being stored on an article of manufacture (e.g., a computer-readable medium) to allow transporting and transferring such methods to computers for execution, and thus implementation, by a processor or for storage in a memory.

FIG. 3 illustrates a flow chart or method 300 that can be used to dynamically creates technology based geofences around defined or definable areas for UE, in particular aerial UE, while ensuring the safe operation of UE. Method 300 can be used by central node global control equipment located on the core network. Examples of central node global control equipment can be MEC equipment, SON equipment, and/or RIC equipment.

Method 300 can commence at act 302 wherein central node global equipment (e.g., fencing engine 102) can identify UE, and in particular aerial UE, based at least in part, for example, on IMSI values, or SIM values. Additionally and/or alternatively, at act 302, fencing engine 102 can identify approaching UE based other subscriber or subscription data, such as unique UE serial number values, governmentally issued unique identification values, such as federal aviation administration tag values, UE manufacturer serial number values, UE model number values, unique visual identification values affixed to UE, unique identification values rendered perceivable using, for example, irradiated ultra-violet light, and/or unique identification values rendered observable, for instance, through illumination using infra-red light.

At act 302, identification of approaching UE can be facilitated by fencing engine 102 through use of one-dimensional and/or multi-dimensional scanning technologies and barcode symbology, such as UPCs, matrix bar codes comprising machine-readable optical labels, and the like that can include information about the equipment to which it is attached.

Further, at act 302, identification of approaching UE can be effectuated fencing engine 102 by using computer-vision based recognition technologies, wherein one or more unique surface contours (or identifiable surface point patterns) of the approaching UE can be compared with repositories and databases of manufacture defined contours or determinable surface point patterns associated with UE.

At act 304, fencing engine 102, having identified and/or detected approaching UE, can monitor and track the detected UE to determine whether or not the approaching UE is on a trajectory that may encroach into the vicinity of identified or identifiable restricted areas. In order to determine whether or not the approaching UE may be on a trajectory that may encroach into identified and/or identifiable restricted areas, at act 304, fencing engine 102 can utilize, for instance, artificial intelligence technologies, neural networking architectures, collaborative filtering processes, machine learning techniques, and/or big data mining functionalities, wherein, for example, probabilistic determinations based at least in part on cost benefit analyses can be performed.

At act 304, fencing engine 102 can also employ artificial intelligence technologies, neural networking architectures, collaborative filtering processes, machine learning techniques, Bayesian belief systems, big data mining and data analytic functionalities, and the like, wherein, for example, multi-objective optimization can be used to determine whether or not an action should be initiated and implemented. Multi-objective optimization can ensure that first actions or groups of first actions can only be implemented provided that other second actions or groups of other second actions are not detrimentally affected.

Additionally, at act 304, fencing engine 102, in order to track UE entering and/or exiting the control and/or the monitoring ambit of equipment associated with network equipment 100, can also use one or more GNSS equipment that can provide geolocation and/or time information to GPS equipment anywhere on or near the earth where there is an unobstructed line of sight to the one or more GNSS equipment, such as one or more GPS satellites in various earth orbits.

Additionally and/or alternatively, fencing engine 102, at act 304, can use other triangulation processes to keep track of UE. For instance, in various embodiments, methods for determining ranges (e.g., variable distances) by targeting UE with light amplification by stimulated emission of radiation and measuring the time for the reflected light to return to one or more receiver can be used to track UE approaching and/or entering into a determined vicinity of a restricted area. In a similar manner, fencing engine 102 can use the facilities and/or functionalities of detection systems that use radio waves to determine the range, angle, or velocity of objects and to determine whether or not UE are approaching and/or entering into the determined vicinity of the restricted area.

Other mechanisms that can be used at act 304 to track UE can also include determining UE position based on the measurement of the TOA of one or more energy wave having known waveforms and/or speed when propagating either from and/or to multiple emitters and/or receivers of the waves such as one or more network equipment (e.g., serving cell equipment, base station equipment, IoT equipment, picocell equipment, femtocell equipment, and similarly functional equipment). In some instances, a UE's returned signal strength values to various antennae associated with the one or mode network equipment (e.g., network equipment 100, serving cell equipment, base station equipment, IoT equipment, picocell equipment, femtocell equipment, and similarly functional equipment, . . . ) can be used to triangulate and provide positional references as to the trajectory of an individual UE.

Fencing engine 102 based on determining that UE is approaching a restricted area can initiate processes to facilitate and/or effectuate the following tasks: at act 306 mandate serving cell equipment proximate, tracking, and/or monitoring the trajectory of UE to transmit a customized system information block (SIB) message to the UE to warn an operator/user entity, via display equipment associated with the UE that the UE is about to encroach into the defined or determinable restricted area, and that the operator/user should direct the UE to change trajectory to avoid the defined or determinable restricted area; and/or at 308 when serving cell equipment proximate, tracking, and/or monitoring the trajectory of UE observes that the UE has not changed its trajectory to avoid entering the defined or determinable restricted area, and is getting close to entering the defined or determinable restricted area, the fencing engine 102 can require serving cell equipment proximate, tracking, and/or monitoring the trajectory of UE to establish an artificially established coverage hole in order to deter the encroaching UE from entering the defined and determined restricted area by adjusting or changing its trajectory away from the restricted area, and to ensure that the encroaching UE avoid the artificially established coverage hole.

In the foregoing manner, fencing engine 102 can create a technology based geofence around restricted areas for UE (e.g., aerial UE) served by terrestrial based LTE and/or 5G network equipment associated with MNOs. As has been observed earlier, restricted areas, in some embodiments, can be permanently restricted areas, such around airports, military bases, and identified governmental structures (e.g., parliamentary buildings, important governmental offices, and similar such structures). In other embodiments, the restricted areas and be contemporaneously and temporarily established, such as when special events are planned or are on-going during determined times, during times of national emergencies (e.g., localized disaster relief efforts, . . . ), and the like.

Figure 8:
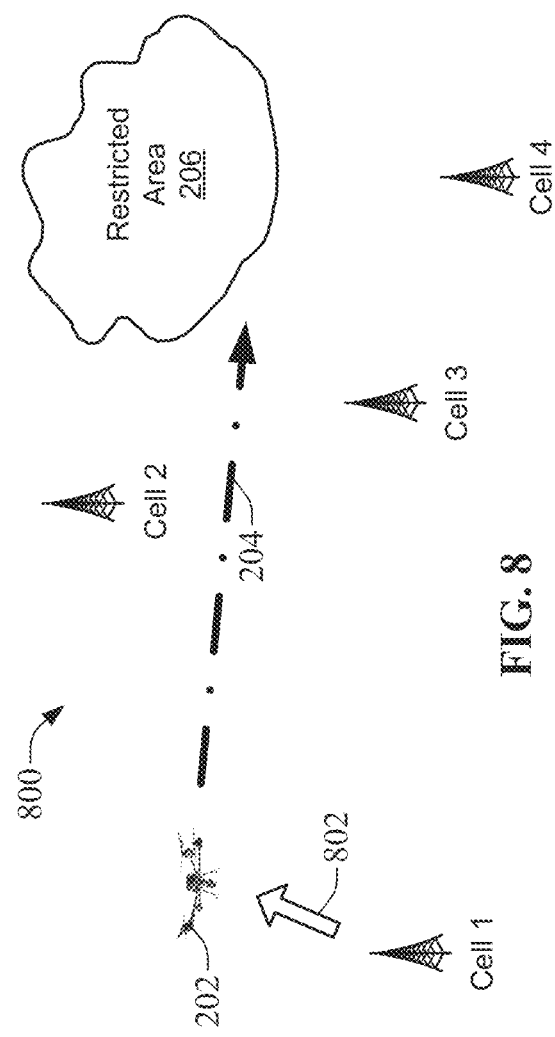
FIG. 8 depicts a communication link established between an aerial UE and serving cell equipment, in accordance with aspects of the subject disclosure.
Figure 9:
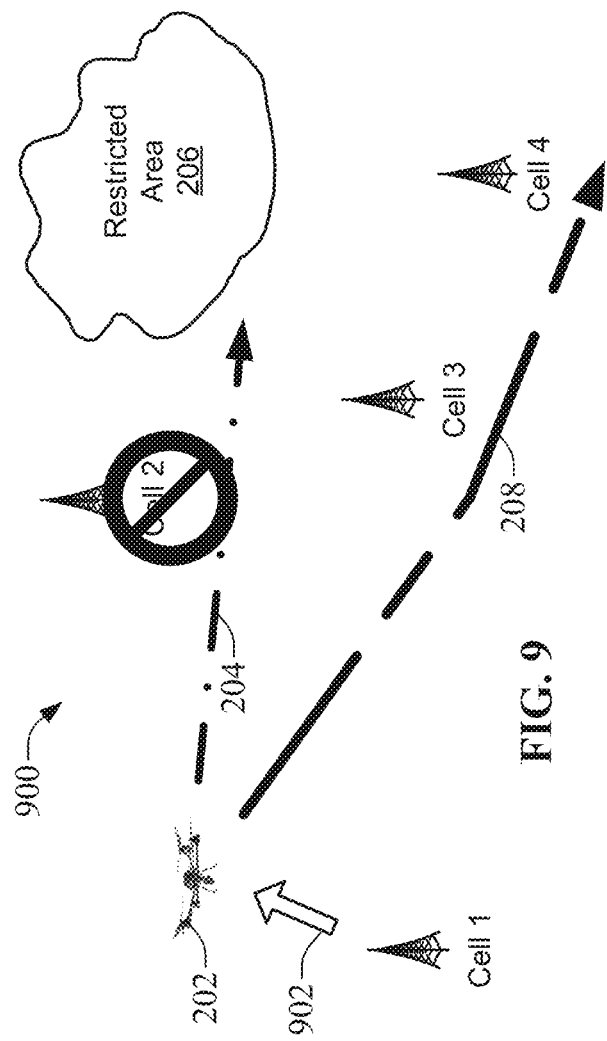
FIG. 9 illustrates another communication link established between an aerial UE and serving cell equipment, in accordance with aspects of the subject disclosure.

FIG. 4 depicts an example time sequence chart 400 that can be used to dynamically create technology based geofences around defined or definable areas for UE, in particular aerial UE, while ensuring the safe operation of UE. The described time sequence chart 400 can be implemented on aerial UE (e.g., aerial UE 202). At act 402 (and with reference to FIG. 8), aerial UE 202 can be in communication with first serving cell equipment (e.g., cell 1) via communication link 802. At act 402 aerial UE 202 can receive a first customized SIB message (e.g., first customized SIB message 500). As has been noted, the first customized SIB message can be a warning message to aerial UE 202 that aerial UE 202 should adjust its trajectory. At act 404 (and with reference to FIG. 9) aerial UE 202 can receive a second customized SIB message (e.g., second customized SIB message 600) via communication link 902. As noted above, the second customized SIB message can include a biasing value (e.g., CIO=−100 dBm) that can be introduced into pilot signals to add a negative bias (or a positive bias) so that aerial UE 202 is discouraged from effectuating a handover to serving cell equipment (e.g., cell 2 as illustrated in FIG. 8 and FIG. 9) in the proximity of a restricted area, and is rather encouraged to effect a handover to serving cell equipment (e.g., cell 3, cell 4, . . . ) that can cause the target UE modify its trajectory in order to avoid the restricted area. At acts 406, and with reference to FIG. 8, aerial UE 202 can perform a scan of serving cell equipment (e.g., cell 2 and cell 3) signal pilots (e.g., RSRP values returned by serving cell equipment [e.g., cell 2 and cell 3] at act 408) taking into account of the CIO bias value that was conveyed in the second customized SIB message (e.g., second customized SIB message 600). At act 410, aerial UE 202 can compare the signal pilot values. For instance, since the CIO biasing value included in the second customized SIB message indicated that a bias value of −100 dBm is to be added to retuned signal pilots from cell 2, the comparison of the signal pilot values returned by cell 2 with the signal pilot values returned by cell 3 would be indicative to aerial UE 202 that cell 3 has the stronger signal pilot, and that aerial UE 202 should adjust its trajectory (at act 412) from that described by trajectory 204 (illustrated in FIG. 8) to a trajectory that better corresponds to trajectory 208 (illustrated in FIG. 9).

FIG. 5 illustrates a first customized SIB message 500 that can be transmitted by central node global control equipment to aerial UE (e.g., aerial UE 202) that enter into areas (e.g., area 200) controlled by central node global control equipment, wherein the areas into which aerial UE 202 is entering can include one or more restricted areas (e.g., restricted area 206). The first customized SIB message can be considered as a public warning system (PWS) message and can be color coded.

For instance, central node global control equipment can use a coding scheme wherein in some instances customized SIB messages that do not connote warnings can be colored green when displayed on display equipment associated with UE. In other instances, central node global control equipment can ensure that the customized SIB messages that denote warning message are displayed on display equipment associated with UE in shades of amber or orange. In additional instances, central node global control equipment can require the customized SIB messages that denote emergency or indicate danger to be displayed, on UE operator display equipment associated with UE, in shades of red.

Other schemes of conveying relative urgency can also be used by central node global control equipment. For instance, in instances where the customized SIB message is a routine informational message, central node global equipment can facilitate the UE operator display equipment to just display the customized SIB message without any enhancements. In other instances, where the customized SIB messages is a warning message, central node global equipment can facilitate the UE operator display equipment to flash or pulse the message at a first defined rate. In additional instances, where the customized SIB message is an emergency message, central node global equipment can facilitate the UE operator display equipment to flash or pulse the message at a second defined rate, wherein the first defined rate is slower than the second defined rate.

In additional and/or alternative schemes for conveying relative urgencies associated with customized SIB messages, central node global equipment can cause the UE operator display equipment to emit sounds and/or vibrate with regard to disparate customized SIB messages. For example, when the customized SIB message is routine information, central node global equipment can cause the UE operator display equipment to emit no sound and/or not vibrate. In instances where the customized SIB is a warning message, central node global equipment can instruct the UE operator display equipment (e.g., via data included in the customized SIB message) to emit a sound at a first sound frequency and/or vibrate at a first vibrational frequency, In instances where the customized SIB message is an emergency message, central node global equipment can instruct the UE operator display equipment to emit a sound in a second sound frequency and/or vibrate at a second vibrational frequency. As will be noted by those of ordinary skill the first sound frequency can be different from the second sound frequency, and the first vibrational frequency can be distinct from the second vibrational frequency. Moreover, in relation to the first and second vibrational frequencies, these can be applied to a control column or joystick associated with controlling the flight surfaces of aerial UE. As will be appreciated by persons of ordinary skill, a control column or joystick is an input device consisting of a stick that pivots on a base and reports its angle or direction to the device it is controlling.

In regard to FIG. 5, the first customized SIB message 500, as depicted, can comprise at least data representing the target UE (e.g., aerial UE 202). The data representing the target UE can represent an IMSI value that can have been assigned for use by the target UE. Additional data that can be included in the first customized SIB message 500 can comprise object type data, such as what type of message is being conveyed in the customized SIB message (e.g., first customized SIB message 500 is a warning message or alert message). Further data included in the first customized SIB message 500 can include message data such as "amber alert modify trajectory."

With reference to FIG. 6, second customized SIB message 600, as illustrated can comprise at least data representing the target UE such as IMSI value data that can uniquely distinguish and identify the target UE from other UE that can be present and are being monitored and tracked by central node global control equipment (e.g., network equipment 100). Also included in the second customized SIB message 600 can be a cell individual offset (CIO) value. The CIO value can be introduced into pilot signals to add a negative bias (or a positive bias) so that the target UE is discouraged from effectuating a handover to serving cell equipment in the proximity of a restricted area, and is rather encouraged to effect a handover to serving cell equipment that will cause the target UE modify its trajectory in order to avoid the restricted area. As depicted in FIG. 6 the CIO value that has been assigned for use by the target UE (e.g., aerial UE 202), in this instance, is −100 decibel milliwatt (dBm—a unit of measure used to indicate a power level expressed in decibels (dB) with reference to one milliwatt (mW)). Nevertheless, it should be noted that other biasing values associated with the CIO value can be used with equal facility and/or functionality. Generally, the CIO value can be determined based, for example, on one or more unique factors extant within the controlled and/or monitored area 200 and/or the distribution and/or concentrations of networking equipment situated within area 200 and/or proximate to restricted areas 206. Other data that also be included in second customized message 600 can include object type data, such as what type of message is being conveyed in the customized SIB message (e.g., second customized SIB message 600 is a CIO message), and, in this example, target cell data—an indication that use of the facilities and/or functionalities associated with serving cell equipment (e.g., Cell 2) is off limits and should not be used.

FIG. 7 illustrates an example customized SIB message 700. As depicted customized SIB message 700 can comprise data representing groups of information elements (IEs) to at least identify the broadcast message and the destination UE, and the action that the UE should perform. As illustrated in FIG. 7 customized SIB message 700 can comprise: message type IE (e.g., UAV.geofencing); destination UE type IE (e.g., aerial); destination UE imsi IE (e.g., 123); warning area coordinate IE (e.g., geographic x and/or y coordinates); warning type IE (e.g., amber alert); target neighbor cell IE (e.g., cell 2); and/or target neighbor cell CIO (e.g., −100).

In regard to the foregoing disclosure, it should be noted that central node global control equipment can collect key performance indicator (KPI) values returned to, or received by, serving cell equipment (or central node global control equipment) by UE (terrestrial based and/or aerial) located within the coverage ambit of serving cell equipment. Examples of KPI values that can be returned by UE to serving cell equipment can include: values associated with RSRP measurement values, received signal strength indicator (RSSI) measurement values, quality of service (QoS) metric values, signal to noise ratio (SNR) values, received signal code power (RSCP) values, signal to interference ratio (SIR) values, signal to interference plus noise ratio (SINR) values, distance measurement values (e.g., determined based on global positioning satellite (GPS) data, geo-location data, geo-tag data, or other such relevant positioning data) indicating distances between UE and serving cell equipment, distance measurement values indicating distances between UE and respective neighboring serving cell equipment, or other similarly appropriate values. As has been noted, KPI values can be values that can have been periodically returned within measurement reports by UE extant with the control and/or coverage ambit associated with network equipment, such as serving cell equipment, neighboring serving cell equipment, or similar network equipment.

Many use cases of unmanned aerial vehicles (UAVs), such as drones, require beyond visual line of sight (LOS) communications. Mobile networks can offer wide area, high speed, and secure wireless connectivity, which can enhance control and safety of UAV operations and enable beyond visual LOS use cases. Existing long term evolution (LTE) networks can support initial drone deployments. LTE evolution and 5G can provide more efficient connectivity for wide-scale drone deployments. New and exciting applications for drones are being envisioned and are emerging. These envisioned and prospective applications can be a potential boon for mobile network operator entities. Use cases of commercial UAVs are growing rapidly, including delivery, communications and media, inspection of critical infrastructure, surveillance, search-and-rescue operations, agriculture, and similar worthy endeavors.

Research and development of current mobile broadband communication (e.g., LTE) has been primarily devoted to terrestrial based communication. Providing tether-less broadband connectivity for UAVs is an emerging field.

Figure 10:
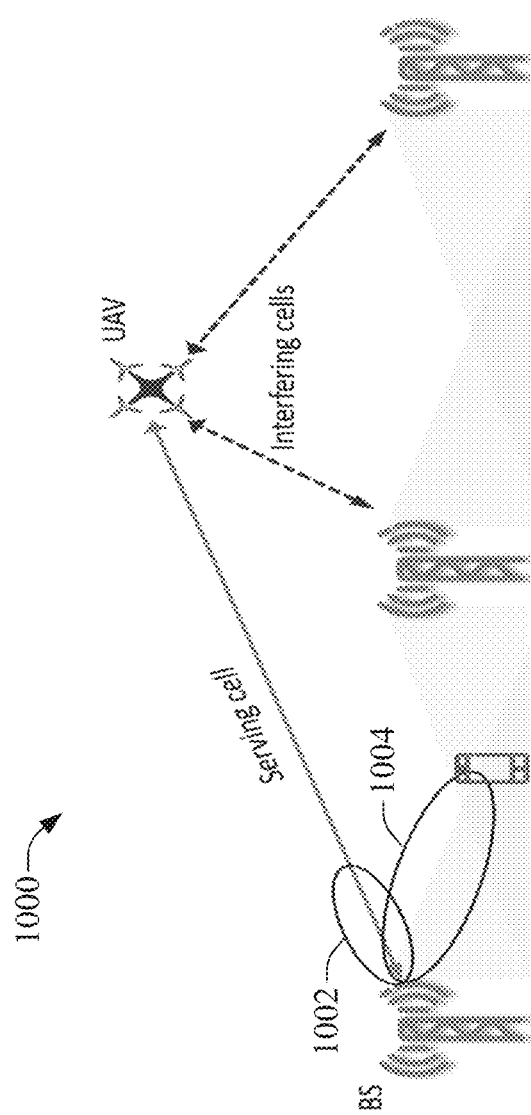
FIG. 10 provides illustration of how network equipment antenna direction affects aerial user equipment, in accordance with aspects of the subject disclosure.

One main aspect that makes using LTE to serve UAVs challenging is the fact that mobile LTE networks are generally optimized for terrestrial broadband communication. Thus, the antennas associated with terrestrial based serving equipment (such as base station equipment, eNodeB equipment, eNB equipment, gNodeB equipment, picocell equipment, macrocell equipment, microcell equipment, femtocell equipment, IoT equipment operating as mobile network operation (MNO) network equipment, access point equipment, and the like) are typically down-tilted to reduce the interference power levels to other serving cell equipment. With down tilted antennas, small UAVs may thus only be served by transmission or broadcast side lobes of the antennas associated with terrestrial based serving cell equipment. FIG. 10 illustrates the broadcast disparity between the down-tilted antennas 1002 and side lobes 1004.

Due to the presence of possible voids or nulls in the transmission side lobes 1004, and due to close-to-free-space propagation in the sky, aerial UAVs or aerial UEs can detect several ground-based serving cell equipment within a defined geographical area. In addition, aerial UE, since they typically are positioned above terrestrial based radio equipment and above radio signal echo (e.g., radio clutter) emanating from serving cell equipment, can detect stronger signals from distant serving cell equipment (e.g., interfering cells) than terrestrial based UE that are more geographically proximate. Thus, aerial UE can be served by much more distant serving cell equipment (e.g., interfering cells) instead of the most proximate serving cell equipment.

Figure 11:
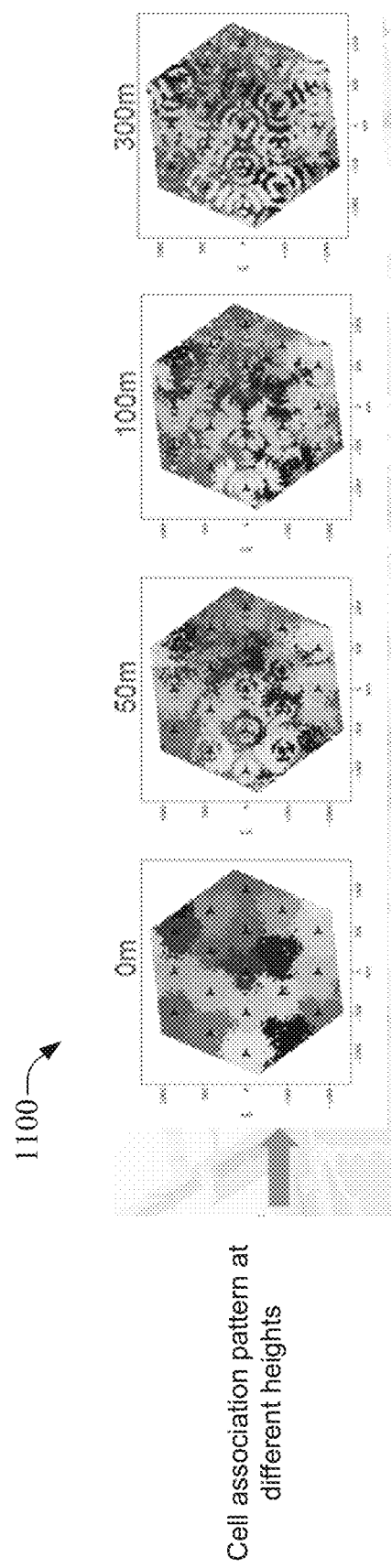
FIG. 11 provides depiction of network equipment association patterns at different altitudes, in accordance with aspects of the subject disclosure.

FIG. 11 provides depiction of the relative disparities in coverage areas between terrestrial coverage areas and aerial coverage areas. In FIG. 11 it will be observed, that at lesser heights, for example, at 0 meters (m) the broadcast coverage area pattern of network cell equipment is generally distinct and clear; the coverage areas being defined clusters around one or more central point associated with respective network cell equipment. However, at greater heights (e.g., 50 m, 100 m, 300 m) above terrain the coverage areas associated with respective network equipment become less and less well defined and more and more amorphous.

Figure 12:
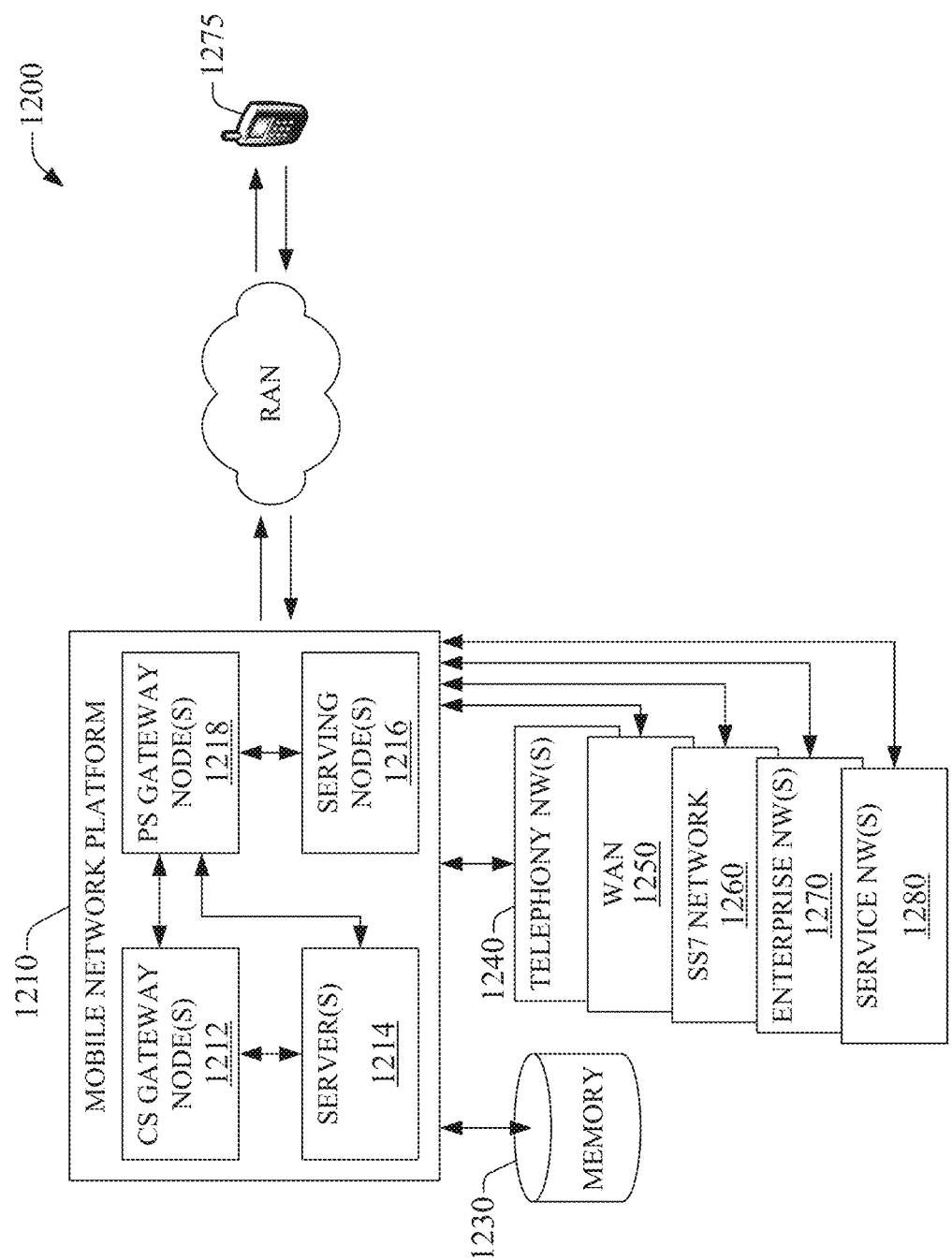
FIG. 12 is a block diagram of an example embodiment of a mobile network platform to implement and exploit various features or aspects of the subject disclosure.

FIG. 12 presents an example embodiment 1200 of a mobile network platform 1210 that can implement and exploit one or more aspects of the disclosed subject matter described herein. Generally, wireless network platform 1210 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1210 can be included in telecommunications carrier networks, and can be considered carrier-side components as discussed elsewhere herein. Mobile network platform 1210 includes CS gateway node(s) 1212 which can interface CS traffic received from legacy networks like telephony network(s) 1240 (e.g., public switched telephone network (PSTN), or public land mobile network (PLMN)) or a signaling system #7 (SS7) network 1270. Circuit switched gateway node(s) 1212 can authorize and authenticate traffic (e.g., voice) arising from such networks. Additionally, CS gateway node(s) 1212 can access mobility, or roaming, data generated through SS7 network 1260; for instance, mobility data stored in a visited location register (VLR), which can reside in memory 1230. Moreover, CS gateway node(s) 1212 interfaces CS-based traffic and signaling and PS gateway node(s) 1218. As an example, in a 3GPP UMTS network, CS gateway node(s) 1212 can be realized at least in part in gateway GPRS support node(s) (GGSN). It should be appreciated that functionality and specific operation of CS gateway node(s) 1212, PS gateway node(s) 1218, and serving node(s) 1216, is provided and dictated by radio technology(ies) utilized by mobile network platform 1210 for telecommunication.

In addition to receiving and processing CS-switched traffic and signaling, PS gateway node(s) 1218 can authorize and authenticate PS-based data sessions with served mobile devices. Data sessions can include traffic, or content(s), exchanged with networks external to the wireless network platform 1210, like wide area network(s) (WANs) 1250, enterprise network(s) 1270, and service network(s) 1280, which can be embodied in local area network(s) (LANs), can also be interfaced with mobile network platform 1210 through PS gateway node(s) 1218. It is to be noted that WANs 1250 and enterprise network(s) 1270 can embody, at least in part, a service network(s) like IP multimedia subsystem (IMS). Based on radio technology layer(s) available in technology resource(s) 1217, packet-switched gateway node(s) 1218 can generate packet data protocol contexts when a data session is established; other data structures that facilitate routing of packetized data also can be generated. To that end, in an aspect, PS gateway node(s) 1218 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1200, wireless network platform 1210 also includes serving node(s) 1216 that, based upon available radio technology layer(s) within technology resource(s) 1217, convey the various packetized flows of data streams received through PS gateway node(s) 1218. It is to be noted that for technology resource(s) 1217 that rely primarily on CS communication, server node(s) can deliver traffic without reliance on PS gateway node(s) 1218; for example, server node(s) can embody at least in part a mobile switching center. As an example, in a 3GPP UMTS network, serving node(s) 1216 can be embodied in serving GPRS support node(s) (SGSN).

For radio technologies that exploit packetized communication, server(s) 1214 in wireless network platform 1210 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1210. Data streams (e.g., content(s) that are part of a voice call or data session) can be conveyed to PS gateway node(s) 1218 for authorization/authentication and initiation of a data session, and to serving node(s) 1216 for communication thereafter. In addition to application server, server(s) 1214 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1210 to ensure network's operation and data integrity in addition to authorization and authentication procedures that CS gateway node(s) 1212 and PS gateway node(s) 1218 can enact. Moreover, provisioning server(s) can provision services from external network(s) like networks operated by a disparate service provider; for instance, WAN 1250 or Global Positioning System (GPS) network(s) (not shown). Provisioning server(s) can also provision coverage through networks associated to wireless network platform 1210 (e.g., deployed and operated by the same service provider), such as femto-cell network(s) (not shown) that enhance wireless service coverage within indoor confined spaces and offload radio access network resources in order to enhance subscriber service experience within a home or business environment by way of UE 1275.

It is to be noted that server(s) 1214 can include one or more processors configured to confer at least in part the functionality of macro network platform 1210. To that end, the one or more processor can execute code instructions stored in memory 1230, for example. It is should be appreciated that server(s) 1214 can include a content manager 1215, which operates in substantially the same manner as described hereinbefore.

In example embodiment 1200, memory 1230 can store information related to operation of wireless network platform 1210. Other operational information can include provisioning information of mobile devices served through wireless platform network 1210, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1230 can also store information from at least one of telephony network(s) 1240, WAN 1250, enterprise network(s) 1270, or SS7 network 1260. In an aspect, memory 1230 can be, for example, accessed as part of a data store component or as a remotely connected memory store.

Figure 13:
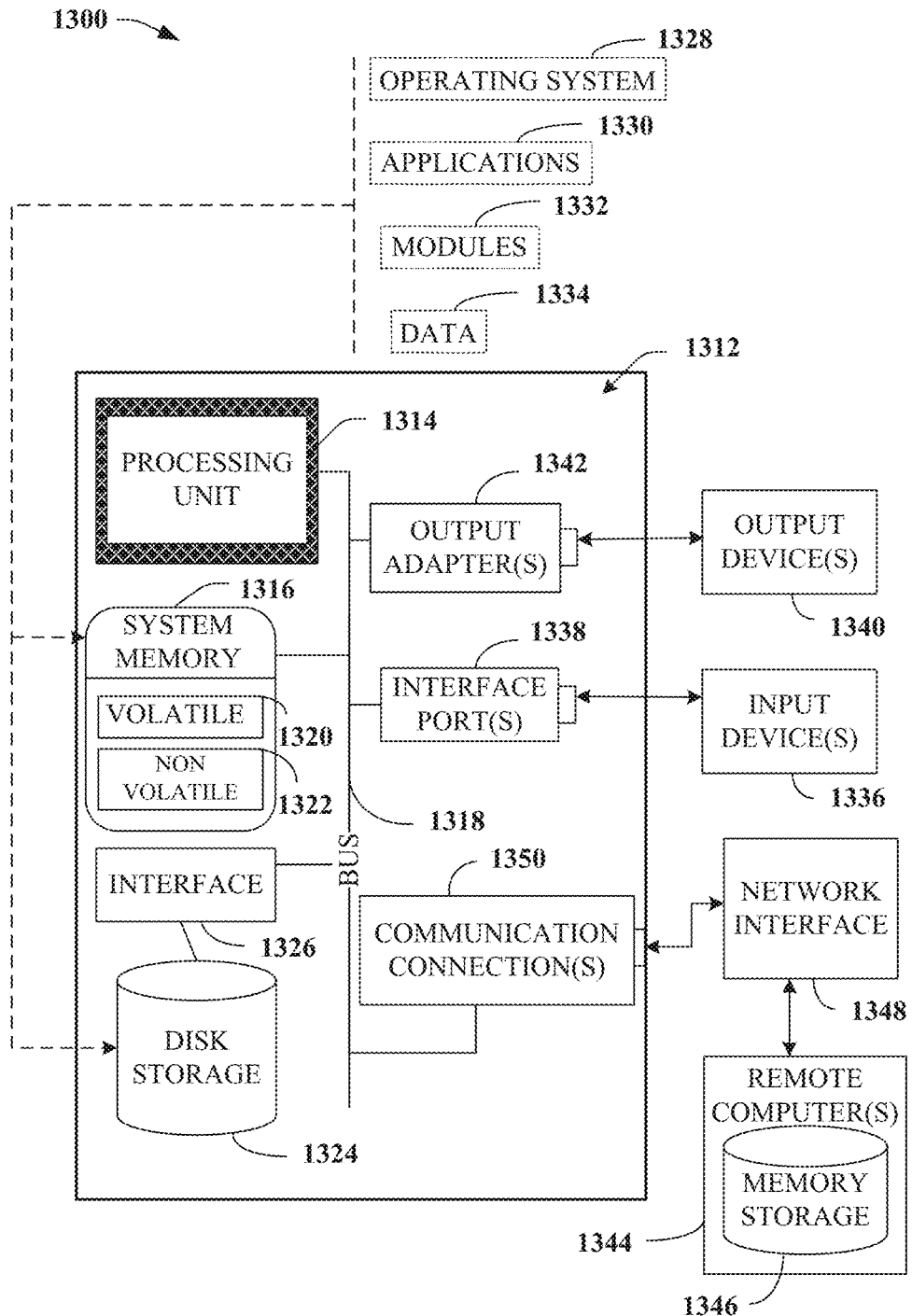
FIG. 13 illustrates a block diagram of a computing system operable to execute the disclosed example embodiments.

In order to provide a context for the various aspects of the disclosed subject matter, FIG. 13, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1320 (see below), non-volatile memory 1322 (see below), disk storage 1324 (see below), and memory storage 1346 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 13 illustrates a block diagram of a computing system 1300 operable to execute one or more parts of one or more of the disclosed example embodiments. Computer 1312, which can be, for example, part of the hardware of system 130, includes a processing unit 1314, a system memory 1316, and a system bus 1318. System bus 1318 couples system components including, but not limited to, system memory 1316 to processing unit 1314. Processing unit 1314 can be any of various available processors. Dual microprocessors and other multiprocessor architectures also can be employed as processing unit 1314.

System bus 1318 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect, Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

System memory 1316 can include volatile memory 1320 and nonvolatile memory 1322. A basic input/output system (BIOS), containing routines to transfer information between elements within computer 1312, such as during start-up, can be stored in nonvolatile memory 1322. By way of illustration, and not limitation, nonvolatile memory 1322 can include ROM, PROM, EPROM, EEPROM, or flash memory. Volatile memory 1320 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1312 can also include removable/non-removable, volatile/non-volatile computer storage media. FIG. 13 illustrates, for example, disk storage 1324. Disk storage 1324 includes, but is not limited to, devices like a magnetic disk drive, floppy disk drive, tape drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to system bus 1318, a removable or non-removable interface is typically used, such as interface 1326.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 13 describes software that acts as an intermediary between users and computer resources described in suitable operating environment 1300. Such software includes an operating system 1328. Operating system 1328, which can be stored on disk storage 1324, acts to control and allocate resources of computer system 1312. System applications 1330 take advantage of the management of resources by operating system 1328 through program modules 1332 and program data 1334 stored either in system memory 1316 or on disk storage 1324. It is to be noted that the disclosed subject matter can be implemented with various operating systems or combinations of operating systems.

A user can enter commands or information into computer 1312 through input device(s) 1336. As an example, mobile device and/or portable device can include a user interface embodied in a touch sensitive display panel allowing a user to interact with computer 1312. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1314 through system bus 1318 by way of interface port(s) 1338. Interface port(s) 1338 include, for example, a serial port, a parallel port, a game port, a universal serial bus (USB), an infrared port, a Bluetooth port, an IP port, or a logical port associated with a wireless service, etc. Output device(s) 1340 use some of the same type of ports as input device(s) 1336.

Thus, for example, a USB port can be used to provide input to computer 1312 and to output information from computer 1312 to an output device 1340. Output adapter 1342 is provided to illustrate that there are some output devices 1340 like monitors, speakers, and printers, among other output devices 1340, which use special adapters. Output adapters 1342 include, by way of illustration and not limitation, video and sound cards that provide means of connection between output device 1340 and system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. Remote computer(s) 1344 can be a personal computer, a server, a router, a network PC, cloud storage, cloud service, a workstation, a microprocessor based appliance, a peer device, or other common network node and the like, and typically includes many or all of the elements described relative to computer 1312.

For purposes of brevity, only a memory storage device 1346 is illustrated with remote computer(s) 1344. Remote computer(s) 1344 is logically connected to computer 1312 through a network interface 1348 and then physically connected by way of communication connection 1350. Network interface 1348 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1350 refer(s) to hardware/software employed to connect network interface 1348 to bus 1318. While communication connection 1350 is shown for illustrative clarity inside computer 1312, it can also be external to computer 1312. The hardware/software for connection to network interface 1348 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) LTE; 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of embodiments illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. Network equipment, comprising:
a processor; and
a memory that stores instructions that, when executed by the processor, facilitates performance of operations, comprising:
identifying aerial user equipment entering a defined geographic area based on subscription data, wherein the defined geographic area is controlled by the network equipment;
monitoring the aerial user equipment and tracking a trajectory associated with the aerial user equipment in relation to a restricted area included in the defined geographic area;
determining, based on the trajectory of the aerial user equipment, that the aerial user equipment is encroaching into the restricted area; and
in response to determining that the aerial user equipment is encroaching into the restricted area, transmitting to the aerial user equipment a customized system information block message comprising data representing a cell individual offset value, wherein the aerial user equipment, based on the cell individual offset value in combination with an actual value of a group of signal pilot values associated with neighbor cell equipment situated proximate to the restricted area, to refrain from initiating a handover process with the neighbor cell equipment.

2. The network equipment of claim 1, wherein the subscription data represents an international mobile subscriber identifier value representative of the aerial user equipment.

3. The network equipment of claim 1, wherein the operations further comprise tracking the trajectory associated with the aerial user equipment using a multilateration process.

4. The network equipment of claim 1, wherein the operations further comprise tracking the trajectory associated with the aerial user equipment using a latitudinal coordinate value received from global navigation satellite system equipment.

5. The network equipment of claim 1, wherein the operations further comprise tracking the trajectory associated with the aerial user equipment using a longitudinal coordinate value received from global navigation satellite system equipment.

6. The network equipment of claim 1, wherein the operations further comprise tracking the trajectory associated with the aerial user equipment using a triangulation process that employs light amplification by stimulated emission of radiation and a return of reflected light to receiver equipment to determine that the trajectory associated with the aerial user equipment is encroaching into the restricted area.

7. The network equipment of claim 1, wherein the cell individual offset value is a negative value that is applied to a signal pilot value of the group of signal pilot values associated with the neighboring cell equipment.

8. The network equipment of claim 1, wherein the cell individual offset value biases a first signal pilot associated with first serving cell equipment relative to a second signal pilot associated with second serving cell equipment.

9. The network equipment of claim 1, wherein the trajectory is a first trajectory, and wherein, based on the cell individual offset value the aerial user equipment adapts the first trajectory to correspond with a second trajectory.

10. The network equipment of claim 9, wherein the second trajectory avoids the restricted area.

11. A method, comprising:
identifying, by network equipment comprising a processor, aerial user equipment entering a defined geographic area based on subscription data, wherein the defined geographic area is controlled by the network equipment;
monitoring, by the network equipment, the aerial user equipment and tracking a trajectory associated with the aerial user equipment in relation to a restricted area included in the defined geographic area;

based on the trajectory of the aerial user equipment, determining, by the network equipment, that the aerial user equipment will imminently encroach into the restricted area; and in response to determining that the aerial user equipment imminently will encroach into the restricted area, transmitting, by the network equipment, to the aerial user equipment, a customized system information block message comprising data representing a warning message, wherein, the aerial user equipment, in response to receiving the customized system information block message, desists from initiating a handover process to establish communication with neighboring network equipment situated within a vicinity of the restricted area.

12. The method of claim 11, further comprising facilitating, by the network equipment, displaying the warning message for view by an operator entity on display equipment associated with the aerial user equipment.

13. The method of claim 11, wherein the customized system information block message is a first customized system information block message, and wherein a second customized system information block message is transmitted to the aerial user equipment, wherein the second customized system information block message comprises data representative of a cell individual offset value.

14. The method of claim 13, wherein the cell individual offset value is a negative value that is applied to a signal pilot associated with serving cell equipment.

15. The method of 13, wherein the cell individual offset value biases a first signal pilot associated with first serving cell equipment relative to a second signal pilot associated with second serving cell equipment.

16. The method of claim 13, wherein the trajectory is a first trajectory, and wherein, based on the cell individual offset value the aerial user equipment modifies the first trajectory to correspond with a second trajectory.

17. A non-transitory machine-readable medium, comprising executable instructions that, when executed by a processor, facilitate performance of operations, comprising:

identifying aerial user equipment entering a defined geographic area based on subscription data, wherein the defined geographic area is controlled by network equipment;

monitoring the aerial user equipment and tracking a trajectory associated with the aerial user equipment in relation to a restricted area included in the defined geographic area;

based on the trajectory of the aerial user equipment, determining that the aerial user equipment is proximate to the restricted area;

in response to determining that the aerial user equipment is proximate to the restricted area, transmitting to the aerial user equipment, a first customized system information block message comprising data representing a warning message;

determining that the aerial user equipment, based on the warning message, has not adapted the trajectory to avoid the restricted area; and transmitting to the aerial user equipment a second customized system information block message comprising data representative of a cell individual offset value representing a biasing value, wherein, based on an application of the biasing value to a key performance value of a group of key performance indicator values associated with neighboring cell equipment in proximity to the restricted area, the aerial user equipment is caused to refrain from initiating data communication with the neighboring cell equipment.

18. The non-transitory machine-readable medium of claim 17, wherein the cell individual offset value is a negative value that is applied to a signal pilot associated with the neighboring cell equipment.

19. The non-transitory machine-readable medium of claim 17, wherein the cell individual offset value biases a first signal pilot associated with first serving cell equipment relative to a second signal pilot associated with second serving cell equipment.

20. The non-transitory machine-readable medium of claim 19, wherein the trajectory is a first trajectory, and wherein the cell individual offset value biases applied to the first serving cell equipment forces the aerial user equipment to not select the first serving cell equipment as target cell equipment which causes a change of the first trajectory to a second trajectory.

* * * * *